March 27, 1934.  M. S. HUCKLE  1,952,805
INTERNAL COMBUSTION ENGINE
Filed Oct. 28, 1930    2 Sheets-Sheet 1

INVENTOR
MYRON S. HUCKLE
by Roberts, Cushman & Woodberg
ATTYS

March 27, 1934.  M. S. HUCKLE  1,952,805
INTERNAL COMBUSTION ENGINE
Filed Oct. 28, 1930  2 Sheets-Sheet 2
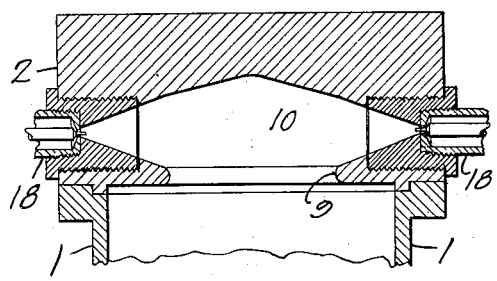
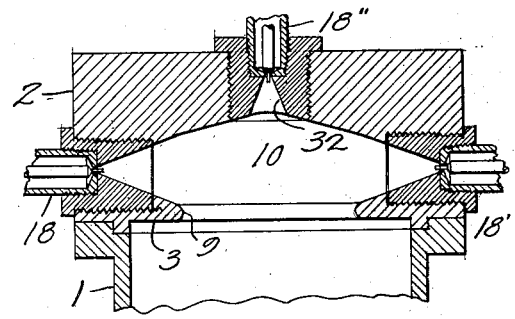
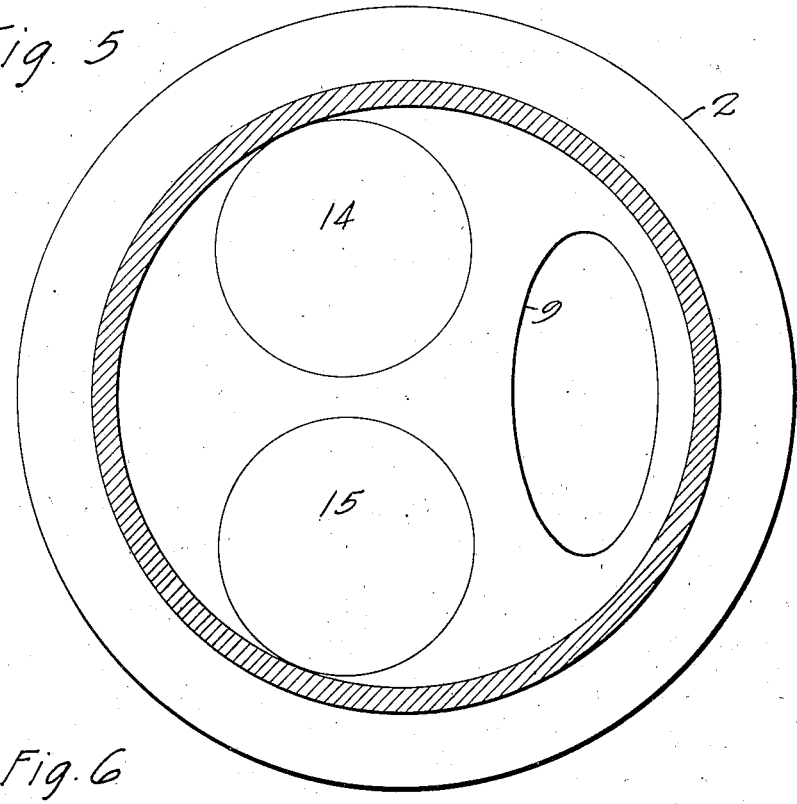
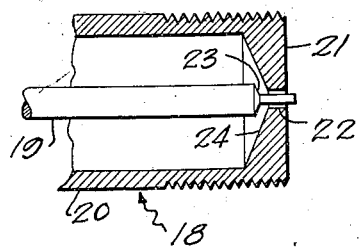
INVENTOR
MYRON S. HUCKLE
by Roberts, Cushman & Woodbury
ATTYS Patented Mar. 27, 1934

1,952,805

UNITED STATES PATENT OFFICE 1,952,805

INTERNAL COMBUSTION ENGINE

Myron S. Huckle, Brookline, Mass., assignor to Bendix Research Corporation, East Orange, N. J., a corporation of Indiana Application October 28, 1930, Serial No. 491,694

2 Claims. (Cl. 123—32)

This invention relates to an improved form of internal combustion engine and particularly to an improved arrangement of the component elements of an engine of the injection type that is suitable for high speed operation.

Engines of the fuel injection type are particularly desirable from the view-point of economy and wide range of fuels which may be satisfactorily and efficiently employed. Motors of this type are particularly advantageous for aircraft use, since fire hazards are materially reduced, and the complications of electrical ignition systems as well as the corresponding interference with radio reception may be eliminated. Furthermore the disadvantages of the conventional carburetor and induction system are avoided. Particularly in high speed motors of the injection type, it is desirable to attain an intimate mixture of the fuel particles and oxygen molecules within a very short interval of time, e. g. an interval of the order of a few thousandths of a second.

Accordingly the present invention affords a type of combustion chamber which is particularly adapted to permit and enhance the effective mixture of by far the greater portion of the air within the cylinder with the fuel under conditions of high turbulence. Furthermore this combustion chamber arrangement not only causes the air within the cylinder to have high turbulence as the piston reaches the top of its stroke, but also permits this turbulence to increase in response to an increase in piston speed. The combustion chamber preferably is arranged in conjunction with the fuel nozzle or nozzles so that the fuel does not impinge upon the walls of the chamber or the piston, but rather is caught in the high velocity air vortex that is within the chamber. Moreover a combustion chamber arranged in accordance with this invention may provide high thermal efficiency since it may approach the theoretically ideal spherical form, having a relatively small wall area in proportion to its volume. At the instant of maximum temperature and pressure, the piston is substantially protected from the heat of the ignited charge, thus avoiding undue heating of the piston head. Preferably a simple piston is employed with its upper ring disposed near its top and having a plane upper surface or head, thus permitting lightness and simplicity in construction and low heat losses. The combustion chamber provided by the present invention may be so arranged that substantially the maximum size of valves may be disposed in the cylinder head being provided with any suitable manifold connections to permit the employment of a muffler, super-charger, etc., as desired.

To permit these various desirable advantages, I preferably provide a combustion chamber which communicates with the cylinder proper and thus in effect forms a pre-combustion chamber. The chamber is provided with at least one fuel nozzle or nozzles and has its wall surface shaped closely to conform to the shape or pattern of the jet emanating from the nozzle under the pressure conditions existing within the cylinder. The nozzle may supply a jet in the form of a hollow cone or in the form of a solid cone of atomized fuel particles, and the combustion chamber wall may be shaped to conform substantially to the conical shape of the jet; preferably the combustion chamber is provided with a double conical form, the apex portions of the cones thus defined being disposed at the opposite ends of the chamber and the nozzle or opposite nozzles being disposed at these ends of the chamber, and the axis of the double cone defined by the chamber being disposed in a plane normal to the cylinder axis. If a third nozzle is employed it preferably is disposed between the ends of the chamber and has its axis extending at right angles to the longitudinal axis of the chamber. Preferably a chamber of this shape is disposed above the cylinder proper and the piston at one side of a diametric line extending along the top of the cylinder, the chamber communicating with the upper part of the cylinder proper through a substantially oval or elliptical opening which is disposed adjoining the cylinder wall. This opening or port and the chamber may be arranged so that the resistance to gas movement and the corresponding losses are relatively low despite the high turbulence permitted by this construction. Preferably the volume of the chamber is so determined in relation to the compression ratio of the cylinder and the relative position of the piston head and cylinder head that by far the major portion of the air received within the cylinder passes into the combustion chamber at the top of the piston stroke, for example, the chamber may receive substantially 90% of the air that is received by the cylinder. The arrangement of the port between the chamber and the cylinder proper causes the air to pass tangentially into the chamber at high speed as the piston approaches the top of the cylinder, the air having a rotary movement in relation to the axis of the chamber, which is facilitated by the generally circular cross-sectional shape of the latter and which causes thorough mixture of the fuel and oxygen molecules. Furthermore this arrangement of the combustion chamber in relation to the cylinder head leaves a large head area which may be employed for valve seats and valve connections; accordingly this arrangement permits the employment of valves which may be substantially as large as can be employed in conventional overhead valve motors. The arrangement of the combustion chamber and cylinder head in this manner also is advantageous, since the major portion of the area of the piston head is in contact with the relatively cool air that is not mixed with the ignited fuel and only a comparatively small area of the head, i. e. that under the opening which communicates with the combustion chamber is directly exposed to the hot gases.

In the accompanying drawings:

Figs. 3 and 4 are sectional views similar to Fig. 2 but upon a smaller scale and showing optional combustion chamber and nozzle arrangements;

Fig. 5 is a section on line 5—5 of Fig. 1; and

Fig. 6 is a sectional detail of a typical fuel nozzle.

Figure 1:
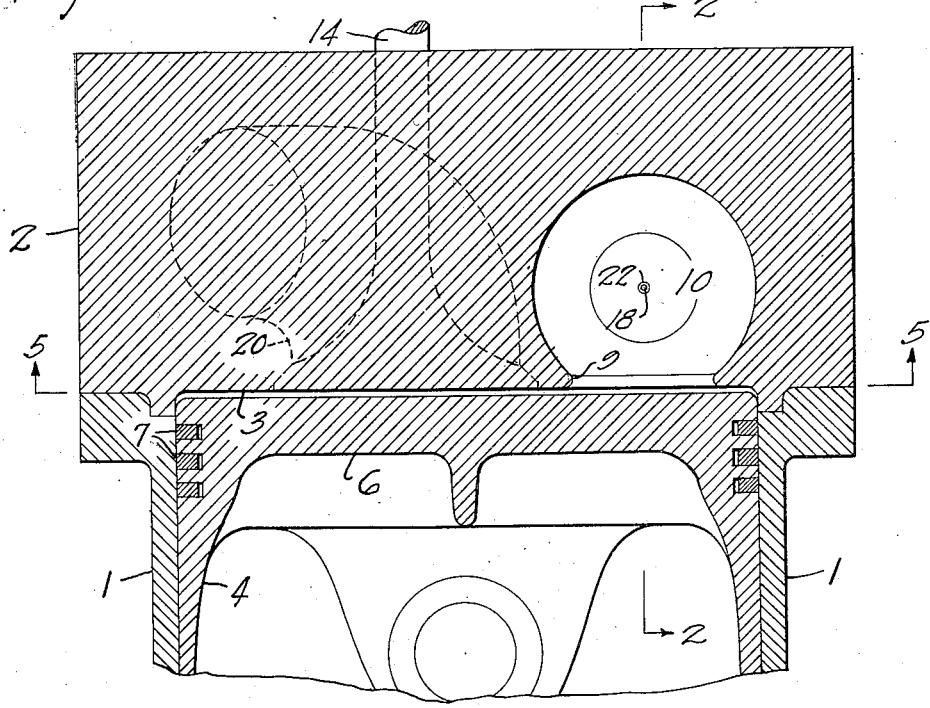
Fig. 1 is a vertical sectional view through the head of a cylinder of an internal combustion engine constructed in accordance with the present invention.
Figure 2:
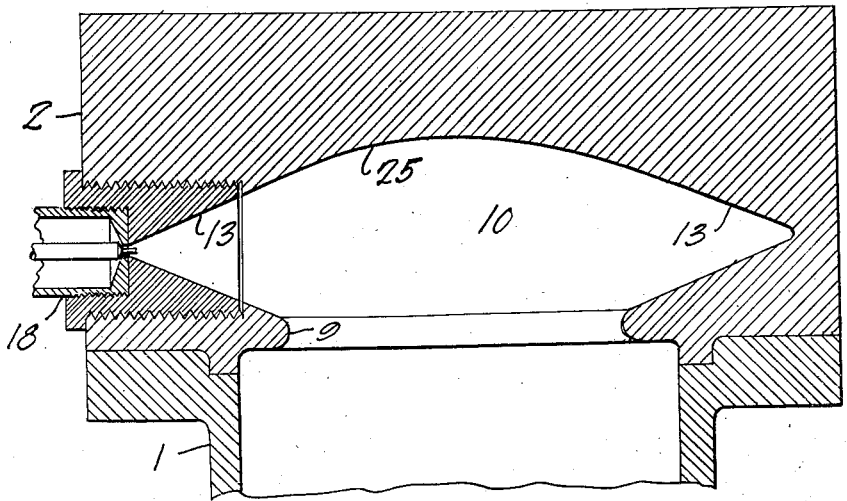
Fig. 2 is a vertical section indicated by line 2—2 of Fig. 1.

Referring to the accompanying drawings and more particularly to Figs. 1 and 2 thereof, my invention is applicable to the cylinder 1 of an internal combustion engine. This engine may be of practically any type, for example, operating upon the Otto, Diesel, or the Sabathe cycles or any desired modification of the same; the motor may be air or liquid cooled and may be provided with any desired cooling jacket or cooling fins which are omitted in the present disclosure for clarity of illustration.

As shown for example, the cylinder 1 may be of the barrel type and the head 2 may provide a substantially plane surface 3 at the upper end of the cylinder. The piston 4 may be of any desired type, but preferably, as shown, is provided with a substantially planar head 6 and rings 7 which may be disposed close to the head. The piston is shown in the upper end of the cylinder in Fig. 1, and preferably is spaced at but a slight clearance distance below the surface 3 of the head. Accordingly but a small amount of air is pocketed between the piston and the head at the upper part of the piston stroke; for example, as much as 90% of the air may be contained in the combustion chamber 10, the space between the head and piston, together with the chamber 10, being arranged to form a combustion chamber having its median vertical cross-section similar to a recumbent lower case letter "b".

An opening or port 9 of substantially oval or elliptical form is disposed in the head adjoining a portion of the cylinder wall, i. e. substantially at one side of a diametrical line extending across the circular surface 3 of the cylinder head and communicates with the combustion chamber 10. This combustion chamber is preferably of the form shown in Figs. 1 and 2. The ends of the chamber are provided with substantially conical or frusto-conical wall portions designated by numeral 13 which gradually flare and curve or merge into each other at the intermediate part of the chamber, as designated by numeral 25. Thus the chamber substantially defines a double cone with the maximum diameter at the center of the chamber and the apexes of the cones at the ends of the chamber. If the head is cast, the shape of the combustion chamber may be made to fit the spray pattern more accurately, as in Fig. 2, while, as shown in Fig. 3, a double-cone shape without the curvature 25 may be employed to permit the easy machining of the head. In such cases, as shown in Figs. 3 and 4, the inclination of the chamber wall may be slightly less adjoining its intermediate part than adjoining its extremities.

A nozzle 18 preferably is disposed at least at one end of chamber 10, being arranged to emit a jet of fuel into the conical or frusto-conical end 13 of the chamber. Fig. 6 illustrates a typical form of jet 18 which may be of more or less conventional type having a central pintle 19 and an outer tubular casing 20 with an end wall 21 having a frusto-conical inner surface that substantially parallels a beveled shoulder 23 upon the pintle 19. The end wall 21 has a central opening 22 that receives the cylindrical end of the pintle 19. As is well known in the art, a nozzle of this type is adapted to emit a fluid or spray jet in the form of a hollow cone; preferably the shape of the end 13 of the combustion chamber adjoining nozzle 18 is arranged to conform substantially to the shape of this cone so that substantially all of the air in this part of the chamber is brought into intimate contact with the fuel and yet the walls of the chamber are so flared away from the mouth of the nozzle that any substantial impingement of the fuel upon the chamber walls is avoided.

At the top of the piston stroke, due to the small clearance space between the cylinder head and the piston head, substantially all of the air being compressed by the piston will be forced through port 9 tangentially into the chamber 10. As shown particularly in Fig. 1, the longitudinal axis of the combustion chamber is spaced from the surface of the head 3 at a distance somewhat less than the maximum radial dimension of the chamber. Accordingly, the plane of the head intersects the intermediate part of the double cone defined by the chamber so that a portion of the flat head of the piston forms the lower part of the chamber wall while the rest of this chamber is generally circular. This particular arrangement aids the movement of the air tangentially into the combustion chamber. Accordingly the air receives a high rotary speed in the substantially circular chamber 10, the shape of this chamber and of the opening 9 facilitating such a flow of air without high losses due to friction or eddy currents, etc.

The valves 14 and 15 may be of any suitable type and may communicate with the usual manifold passages or ducts 20, one of which is indicated in dotted lines in Fig. 1. It is evident that the disposition of the combustion chamber 10 over the cylinder 1 but at one side of the same leaves ample room for the valves 14 and 15 so that a plane common to their axis may be disposed only slightly at one side of a diametric plane parallel thereto; accordingly, substantially the maximum valve area is permitted in a motor of the valve in the head type.

Even when one nozzle 18 is employed at one end of the combustion chamber, as shown in Fig. 2, the double conical shape is advantageous since the particles at the edges of the jet do not tend to travel with as great velocity and momentum as those at the center, and accordingly the jet tends to conform to the shape not only of the conical chamber end adjoining the nozzle, but also the oppositely tapered conical end portion of the chamber.

In many cases it will be found desirable to provide two nozzles, as shown in Fig. 3 and designated 18 and 18' at opposite ends of the combustion chamber, thus decreasing the length of time which will be necessary to insure substantially complete combustion. Under these conditions one of the nozzles, as the nozzle 18, preferably is arranged to emit a jet having a fairly wide angle, as for example 20°, while the other nozzle 18' is adapted to emit a cone or jet having a much smaller angle, for example of around 8°, so that the jet from one nozzle is received concentrically within the jet from the other nozzle.

Fig. 4 shows three nozzles arranged in conjunction with a single combustion chamber, the intermediate nozzle 18" being disposed above the central part of the chamber and a small conical extension of the chamber designated 32 communicating with the outlet of the nozzle. It is evident that the conical or frusto-conical extension 32 of the chamber has its walls disposed substantially to conform to the shape of the jet emanating from the nozzle 18". Obviously the speed of combustion in a motor of this type is enhanced when two or three nozzles are employed in place of one nozzle; however, a motor arranged in the manner illustrated herein is characterized by comparatively rapid and complete combustion even if only one fuel nozzle is employed.

In the operation of a motor of this character the piston 6 moving toward the top of the cylinder causes air to flow into the combustion chamber 10, the speed of this air flow increasing as the piston head nears the top of the cylinder. Since the port 9 and the chamber 10 adjoin one side of the cylinder, the major portion of the air which is forced into the chamber flows transversely of the cylinder head and accordingly passes into the combustion chamber in a generally tangential direction. Since this chamber has a generally curved or circular shape in the direction of the air flow, the air which thus flows tangentially into the chamber will attain a generally rotary movement or swirling effect. The fuel is injected into the chamber, at or near the instant that the piston arrives, at top center, and the fuel jet or jets will be projected into the rotating body of air which has been compressed to such a pressure that its temperature is high enough to cause combustion of the fuel air mixture. Due to the thorough mixture of the air and fuel which is particularly characteristic of a combustion chamber arranged in this manner, combustion may take place rapidly and the fuel may be almost completely burned. Undesirable depositing of the fuel upon the wall surface of the combustion chamber is avoided since the latter is shaped to conform to the pattern of the fuel jet, and accordingly direct impingement of fuel particles upon the wall of the combustion chamber is substantially prevented. Furthermore, the combustion chamber, while being shaped to avoid undesirable depositing of fuel spray upon its walls and to aid the rapid flow of air and high turbulence within the cylinder is also shaped to provide a small surface area and consequent small heat losses in relation to its volumetric capacity. Thus the thermal efficiency of a motor having a combustion chamber of the type disclosed herein may be relatively high. Furthermore, the arrangement of the combustion chamber adjoining one side of the cylinder but over the same not only aids the turbulence of the mixture within the chamber, but also is advantageous structurally since it leaves adequate room for valve seats in the cylinder head. For example, conventional inlet and exhaust valves may be employed in the case of four cycle motors, or one or two exhaust valves may be disposed in the head and intake ports in the cylinder barrel or vice versa if the motor operates upon the two stroke principle, it being understood that the general advantages of the nozzle combustion chamber and cylinder head arrangement may be realized both with the four stroke and two stroke cycle. Furthermore, this arrangement of the combustion chamber and cylinder head permits by far the major portion of the air to come into direct and intimate contact with the injected fuel while a small fraction of the air, for example 10% or less, is disposed in a relatively thin layer between the cylinder head and piston head at the top of the piston stroke. Thus, the piston is substantially protected against the initial heat of combustion since but a relatively small part of the piston head, i. e. that under the port 9, is directly exposed to this initial maximum temperature. Furthermore, the piston head is also substantially protected against the collection of carbon since but little fuel is likely to be deposited in its unignited form upon the piston head. Thus, for example, even in the case where a third jet 18" is disposed above the piston it is so spaced from the piston head and the velocity of the air vortex within the piston chamber is so high, that but very little of the spray can be deposited upon the piston head.

From the foregoing it is evident that I have provided an advantageous arrangement of the component elements on an internal combustion engine of the injection type which may be advantageously employed with motors operating according to many different cycles and having many different details of design. These advantages include high turbulence, thorough, rapid and intimate mixture of air and fuel, high thermal efficiency, low carbon deposits, and protection of the piston head from excessive temperatures.

It should be understood that the present disclosure is for the purpose of illustration only and that this invention includes all modifications and equivalents which fall within the scope of the appended claims.

I claim:

1. Internal combustion engine comprising a cylinder, a piston reciprocating therein, an extension of the cylinder providing a combustion chamber, said chamber having its maximum cross-sectional size substantially midway of its ends and having wall surfaces tapering inwardly to restricted ends, the longitudinal axis of the chamber which extends through said ends being disposed in a plane substantially at right angles to the axis of the cylinder, means forming a port in the cylinder head connecting the interior of the cylinder and the intermediate part of the chamber, fuel nozzle at one end of said chamber arranged to project a fuel jet into the chamber substantially without impingement upon the adjoining wall surface and in the direction of said longitudinal axis, said port being of generally oval form and having its longest diameter extending substantially parallel to the longitudinal axis of the chamber, the port being disposed in one segmental zone of the head, which occupies substantially less than one half of the head surface.

2. Internal combustion engine comprising a cylinder, a piston reciprocating therein, an extension of the cylinder providing a combustion chamber, said chamber having its maximum cross-sectional size substantially midway of its ends and having wall surfaces tapering inwardly to restricted ends, the longitudinal axis of the chamber which extends through said ends being disposed in a plane substantially at right angles to the axis of the cylinder, means forming a port in the upper part of the cylinder connecting the interior of the latter and the intermediate part of the chamber, and a fuel nozzle at one end of said chamber arranged to project a fuel jet into the chamber substantially without impingement upon the adjoining wall surface and in the direction of said longitudinal axis, said port being of generally oval form and having its longest diameter extending substantially parallel to the longitudinal axis of the chamber, said port being disposed in one segmented zone of the head and of less width than the diameter of the chamber immediately above the port whereat the width is measured, and occupying substantially less than one half of the head surface, the piston having a substantially flat head, and the cylinder head surface being closely spaced from the piston head at the top of the piston stroke, whereby the chamber receives at least substantially 85% of the fluid within the cylinder at the top of the piston stroke.

MYRON S. HUCKLE.